(12) United States Patent
Adams et al.

(10) Patent No.: US 9,112,834 B1
(45) Date of Patent: Aug. 18, 2015

(54) PROTECTING SENSITIVE WEB TRANSACTIONS USING A COMMUNICATION CHANNEL ASSOCIATED WITH A USER

(71) Applicant: Juniper Networks, Inc., Sunnyvale, CA (US)

(72) Inventors: Kyle Adams, Brisbane, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 85 days.

(21) Appl. No.: 14/146,456

(22) Filed: Jan. 2, 2014

(51) Int. Cl.
*H04L 29/06* (2006.01)

(52) U.S. Cl.
CPC .................................... *H04L 63/04* (2013.01)

(58) Field of Classification Search
CPC .............................. H04L 63/18; H04L 63/067
USPC ..................................... 726/2, 11, 12, 21, 27
See application file for complete search history.

(56) References Cited

U.S. PATENT DOCUMENTS

| | | | |
|---|---|---|---|
| 2007/0266257 A1* | 11/2007 | Camaisa et al. | 713/182 |
| 2009/0259848 A1 | 10/2009 | Williams et al. | |
| 2012/0297476 A1 | 11/2012 | Zeljkovic et al. | |
| 2013/0333006 A1* | 12/2013 | Tapling et al. | 726/6 |
| 2015/0087265 A1* | 3/2015 | Disraeli et al. | 455/411 |

OTHER PUBLICATIONS

Google, "2-Step Verification, Strong security for your Google Account", http://www.google.com/landing/2step/, 5 pages, Feb. 19, 2013.
Bowker et al, "FireID Debuts Out-of-Band Transaction Verification Application", http://www.businesswire.com/news/home/20100503005300/en/FireID-...1, May 3, 2010, 2 pages.
Wikipedia, "Man-in-the-browser", http://en.wikipedia.org/wiki/Man-in-the-browser, Sep. 12, 2013, 7 pages.

* cited by examiner

*Primary Examiner* — Joseph P Hirl
*Assistant Examiner* — Kalish Bell
(74) *Attorney, Agent, or Firm* — Harrity & Harrity, LLP (57) ABSTRACT

A security device may receive, from a client device, a request associated with a server device. The security device may determine a communication channel and contact information for validating the request. The security device may provide validation information via the communication channel using the contact information. The security device may receive a validation response from the client device, and may determine whether the validation response is valid. The security device may selectively perform a first action or a second action based on determining whether the validation response is valid. The first action may be performed based on determining that the validation response is valid, and may include providing a validation indicator, with the request, to the server device. The second action may be performed based on determining that the validation response is not valid, and may include providing an invalidation indicator, with the request, to the server device.

20 Claims, 9 Drawing Sheets

PROTECTING SENSITIVE WEB TRANSACTIONS USING A COMMUNICATION CHANNEL ASSOCIATED WITH A USER

BACKGROUND

A web browser running on a client device may become compromised by a malicious attack, such as a man-in-the-browser attack. A man-in-the-browser attack may take advantage of vulnerabilities in the web browser's security to modify web pages, modify transaction content, or insert transactions using the identity of the user. A man-in-the-browser attack may be difficult to detect by a user of the web browser or a host server with which the client device communicates. A hacker may use a man-in-the-browser attack to capture information to harm the user, such as by learning the user's credit card information and using the credit card information to make unauthorized purchases, learning the user's banking information and using the banking information to withdraw funds, or the like.

SUMMARY

According to some possible implementations, a device may include one or more processors configured to: receive, from a client device, a request associated with a server device; determine a communication channel for validating the request; determine contact information for contacting a user, associated with the request, via the communication channel; provide validation information via the communication channel using the contact information; receive a validation response from the client device; determine, based on the validation information and the validation response, whether the validation response is valid; selectively perform a first action or a second action based on determining whether the validation response is valid, the first action being performed based on determining that the validation response is valid, the first action including providing a validation indicator, with the request, to the server device, the validation indicator instructing the server device to respond to the request; and the second action being performed based on determining that the validation response is not valid, the second action including providing an invalidation indicator, with the request, to the server device, the invalidation indicator instructing the server device to not respond to the request.

According to some possible implementations, a computer-readable medium may store one or more instructions that, when executed by one or more processors, cause the one or more processors to: receive, from a client device, a request associated with a user and intended for a server device, the request being sent via a browser of the client device; determine a message type for validating the request; determine contact information, for contacting the user, based on the message type; provide validation information via the message type and using the contact information; receive a validation response from the client device; determine, based on the validation information and the validation response, whether the validation response is valid; selectively perform a first action or a second action based on determining whether the validation response is valid, the first action being performed based on determining that the validation response is valid, the first action including providing a validation indicator, with the request, to the server device, the validation indicator instructing the server device to respond to the request; and the second action being performed based on determining that the validation response is not valid, the second action including providing an invalidation indicator, with the request, to the server device, the invalidation indicator instructing the server device to not respond to the request.

According to some possible implementations, a method may include: receiving, by one or more security devices and from a client device, a request for a resource; determining, by the one or more security devices, a communication channel for validating the request; determining, by the one or more security devices, contact information for contacting a user, associated with the request, via the communication channel; providing, by the one or more security devices, validation information via the communication channel using the contact information; receiving, by the one or more security devices, a validation response; determining, by the one or more security devices and based on the validation information and the validation response, whether the validation response is valid; selectively performing, by the one or more security devices, a first action or a second action based on determining whether the validation response is valid, the first action being performed based on determining that the validation response is valid, the first action including providing a validation indicator, with the request, to the server device, the validation indicator instructing the server device to provide the resource to the client device; and the second action being performed based on determining that the validation response is not valid, the second action including providing an invalidation indicator, with the request, to the server device, the invalidation indicator instructing the server device to not provide the resource to the client device.

DETAILED DESCRIPTION

The following detailed description of example implementations refers to the accompanying drawings. The same reference numbers in different drawings may identify the same or similar elements.

A user may use a web browser on a client device to interact with a webpage hosted by a server device. The client device and the server device may exchange messages based on the user interaction with the webpage. In some cases, the browser may be compromised by a malicious attack, such as a man-in-the-browser attack. A man-in-the-browser attack (or another malicious attack) may cause the client device and the server device to exchange messages, using the identity of the user (e.g., in a user's browser session), without the user's knowledge or permission. A hacker may use such an attack to gain access to sensitive user information (e.g., banking information, credit card information, etc.) or to perform unauthorized transactions (e.g., withdrawing money from a bank account). The server device may not be aware of such an attack because the attack issues requests in the user's browser during the user's browser session with the server device.

Thus, the server device may treat the messages and/or transactions as valid and authorized. Implementations described herein may utilize a security device to protect against such attacks by validating a user using a communication channel other than a potentially compromised web browser.

Figure 1A:
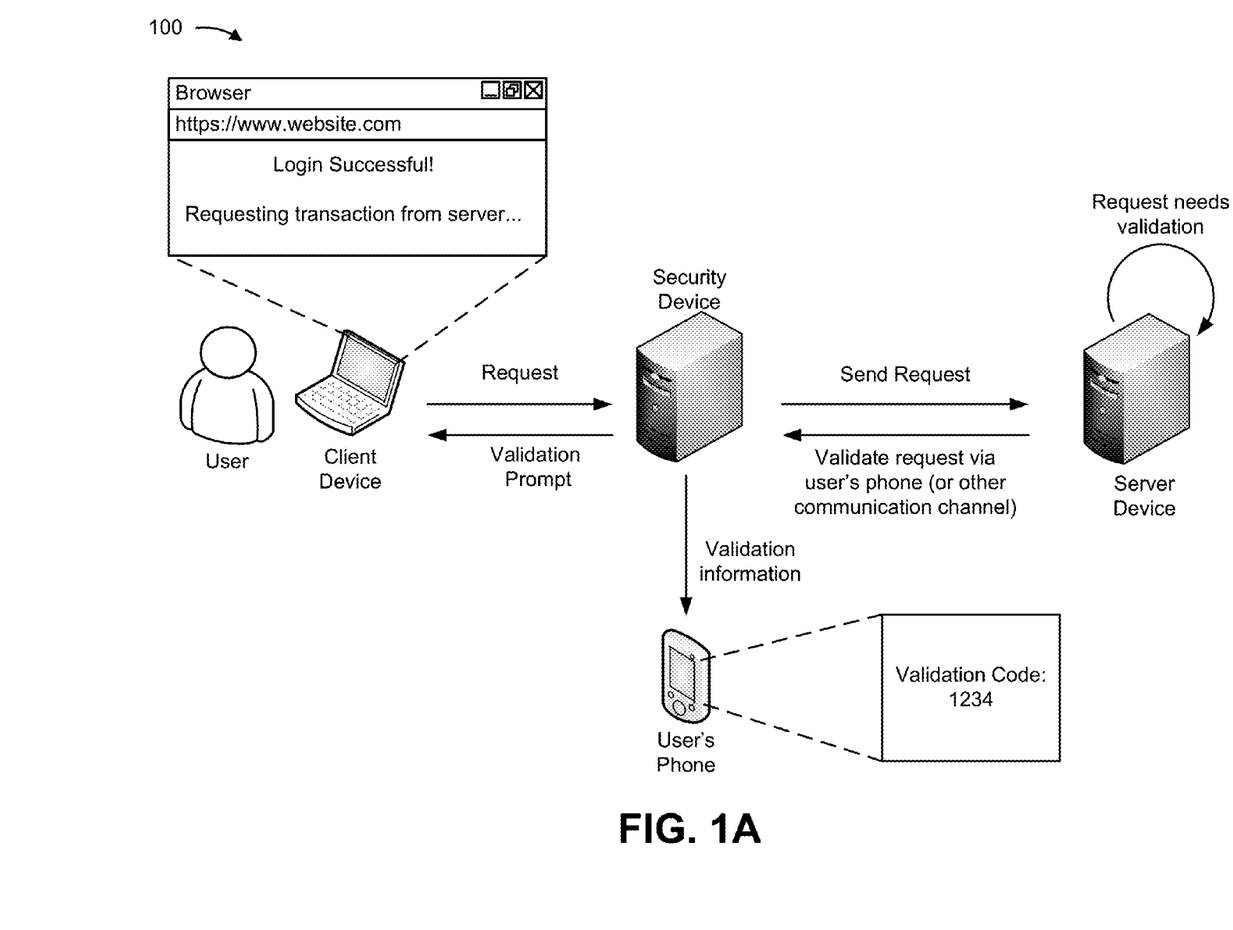
FIGS. 1A and 1B are diagrams of an overview of an example implementation described herein.
Figure 1B:
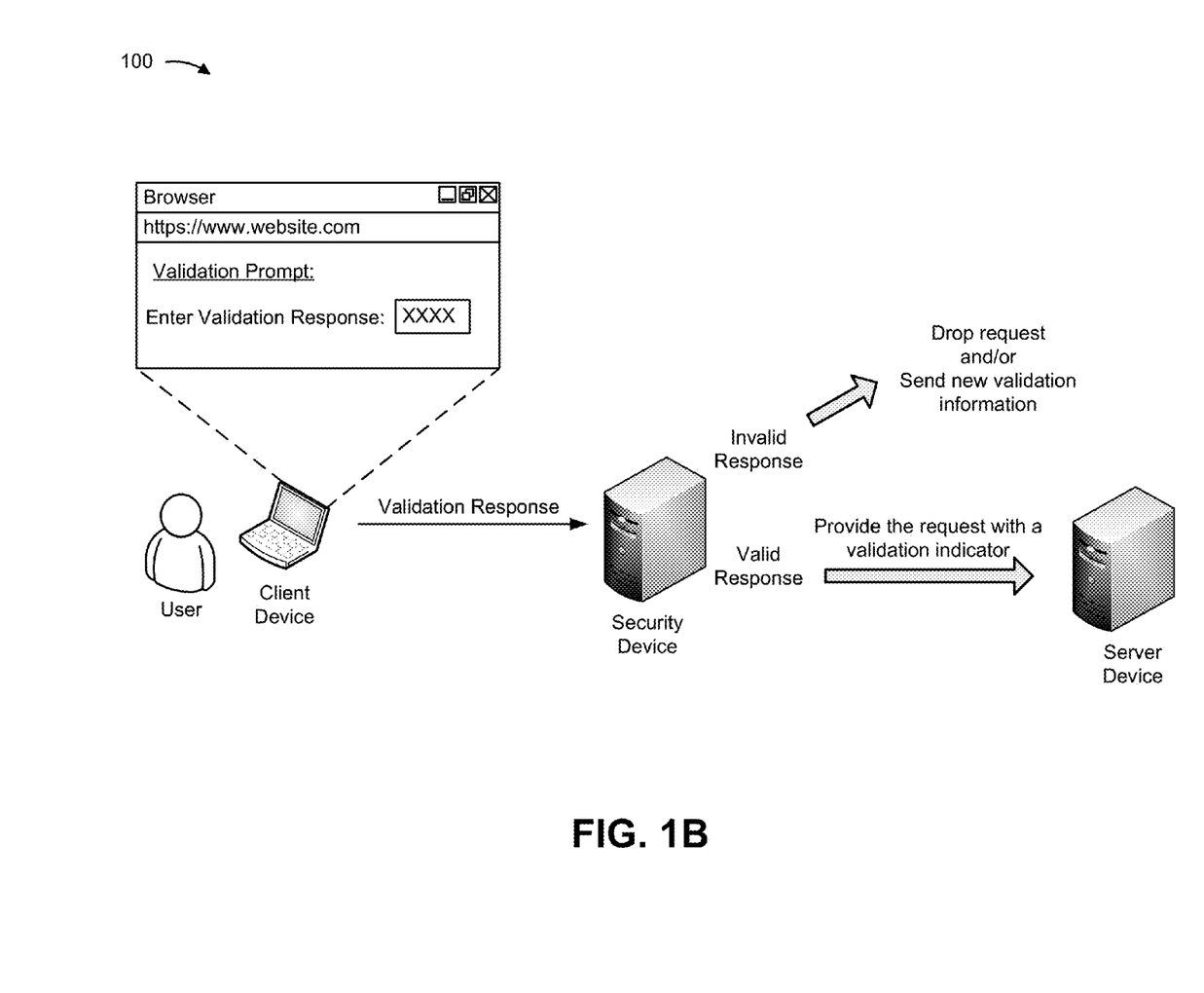

FIGS. 1A and 1B are diagrams of an overview of an example implementation 100 described herein. As shown in FIG. 1A, a user interacting with a client device may use a browser to send a request (e.g., a hypertext transfer protocol (HTTP) request) to a server device. For example, the user may log into the website, and may request a transaction from the server device (e.g., a banking transaction, a credit card transaction, etc.). The server device may be protected by a security device, which may receive the request and forward the request to the server device. The server device may determine that the request needs validation, may determine a communication channel via which the validation is to occur (e.g., via a text message, via a voice message, via an email message, etc.), and may provide the user's contact information to the security device. For example, and as shown, the server device may inform the security device that validation is to occur via a user's phone.

The security device may receive the user's contact information (e.g., the user's phone number) from the server device, and may provide validation information to the user based on the contact information. For example, and as shown, the security device may receive a user's phone number from the server device, and may provide a validation code to the user's phone via a text message. Furthermore, the security device may provide a validation prompt to the client device, which may cause the client device to display a validation prompt for inputting the validation code.

As shown in FIG. 1B, the client device may provide the validation prompt via the browser, and the user may input a validation response using the validation prompt. The security device may receive the validation prompt, and may determine whether the validation response is valid or invalid. If the validation response is invalid (e.g., a validation code input by the user does not match a validation code provided to the user's phone), then the security device may drop the request, may send new validation information (e.g., to the user's phone and/or via a different communication channel), or may take another protective action. If the validation response is valid (e.g., a validation code input by the user matches a validation code provided to the user's phone), then the security device may provide the request and a validation indicator, associated with the request, to the server device.

The security device may store the initial request, and may provide the validation indicator to the server device in a header of the request. In this way, the security device handles validation and protection of the server device. The validation indicator may indicate that the client device has been validated. Based on receiving the validation indicator, the server device may respond to the request (e.g., by sending a response to the client device, by performing a transaction requested by the client device, etc.). In this way, a user may be protected from malicious attacks because the server device may only respond to requests that have been validated, and a malicious attacker may not have access to the communication channel via which the validation information is sent.

Figure 2:
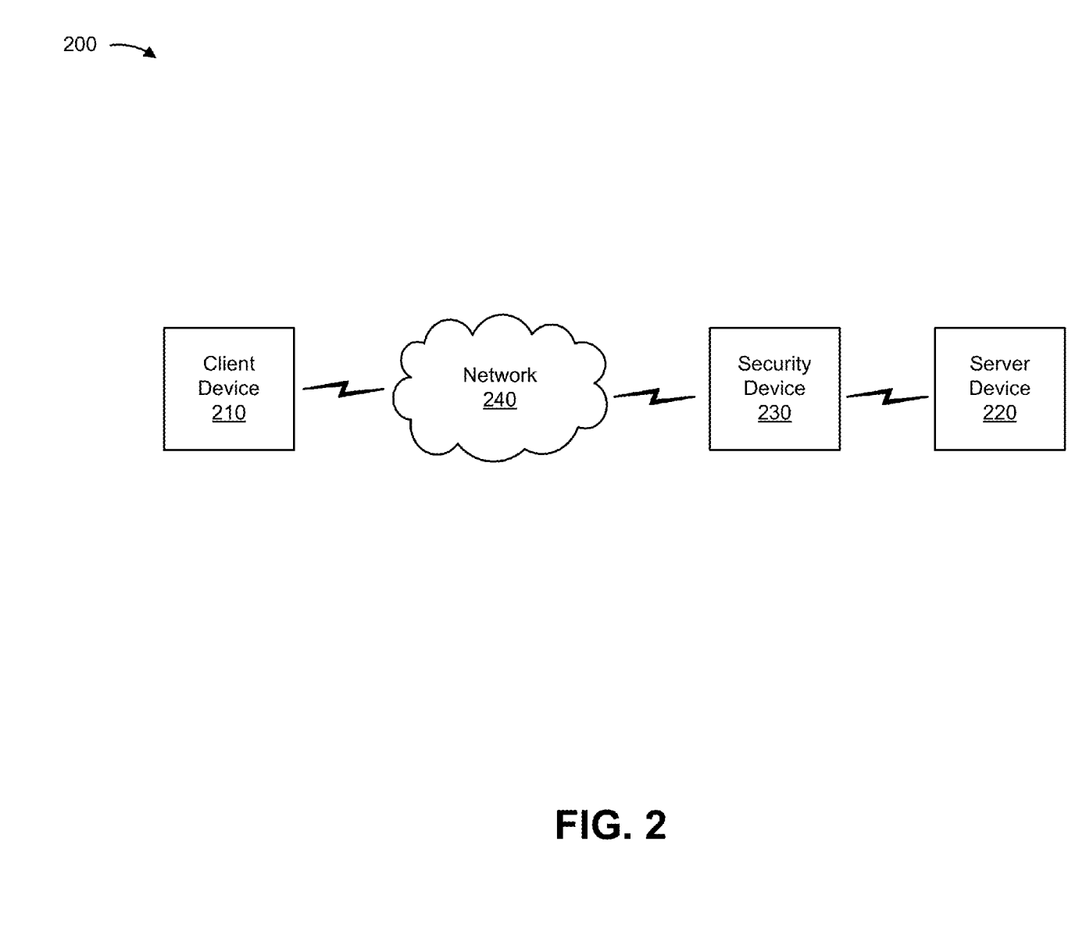
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, a security device 230, and a network 240. Devices of environment 200 may interconnect via wired connections, wireless connections, or a combination of wired and wireless connections.

Client device 210 may include one or more devices capable of receiving and/or providing information over a network (e.g., network 240), and/or capable of generating, storing, and/or processing information received and/or provided over the network. For example, client device 210 may include a computing device, such as a laptop computer, a tablet computer, a desktop computer, a mobile phone (e.g., a smart phone, a radiotelephone, etc.), or a similar device. Client device 210 may receive information from and/or provide information to server device 220 (e.g., via network 240 and/or security device 230). In some implementations, client device 210 may include a browser used to interact with server device 220, such as by sending requests (e.g., HTTP requests) to server device 220 and/or receiving responses (e.g., HTTP responses) from server device 220. In some implementations, requests from client device 210 may be processed by security device 230 before being sent to server device 220.

Server device 220 may include one or more devices capable of receiving and/or providing information over a network (e.g., network 240), and/or capable of generating, storing, and/or processing information received and/or provided over the network. For example, server device 220 may include a computing device, such as a server (e.g., an application server, a content server, a host server, a web server, etc.) or a similar device. Server device 220 may receive information from and/or provide information to client device 210 (e.g., via network 240 and/or security device 230). Server device 220 may respond to requests (e.g., requests for resources, transaction requests, etc.) received from client device 210. In some implementations, responses from server device 220 may be processed by security device 230 before being sent to client device 210.

Security device 230 may include one or more devices capable of processing and/or transferring traffic between client device 210 and server device 220. For example, security device 230 may include a network device, such as a reverse proxy, a server (e.g., a proxy server), a traffic transfer device, a gateway, a firewall, a router, a bridge, a hub, a switch, a load balancer, or the like. Security device 230 may be used in connection with a single server device 220 or a group of server devices 220 (e.g., a data center, a private network, etc.). Communications may be routed through security device 230 to reach the group of server devices 220. For example, security device 230 may be positioned within a network as a gateway to a private network that includes the group of server devices 220. Additionally, or alternatively, communications from client device 210 may be encoded such that the communications are routed to security device 230 before being routed to server device 220.

Network 240 may include one or more wired and/or wireless networks. For example, network 240 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
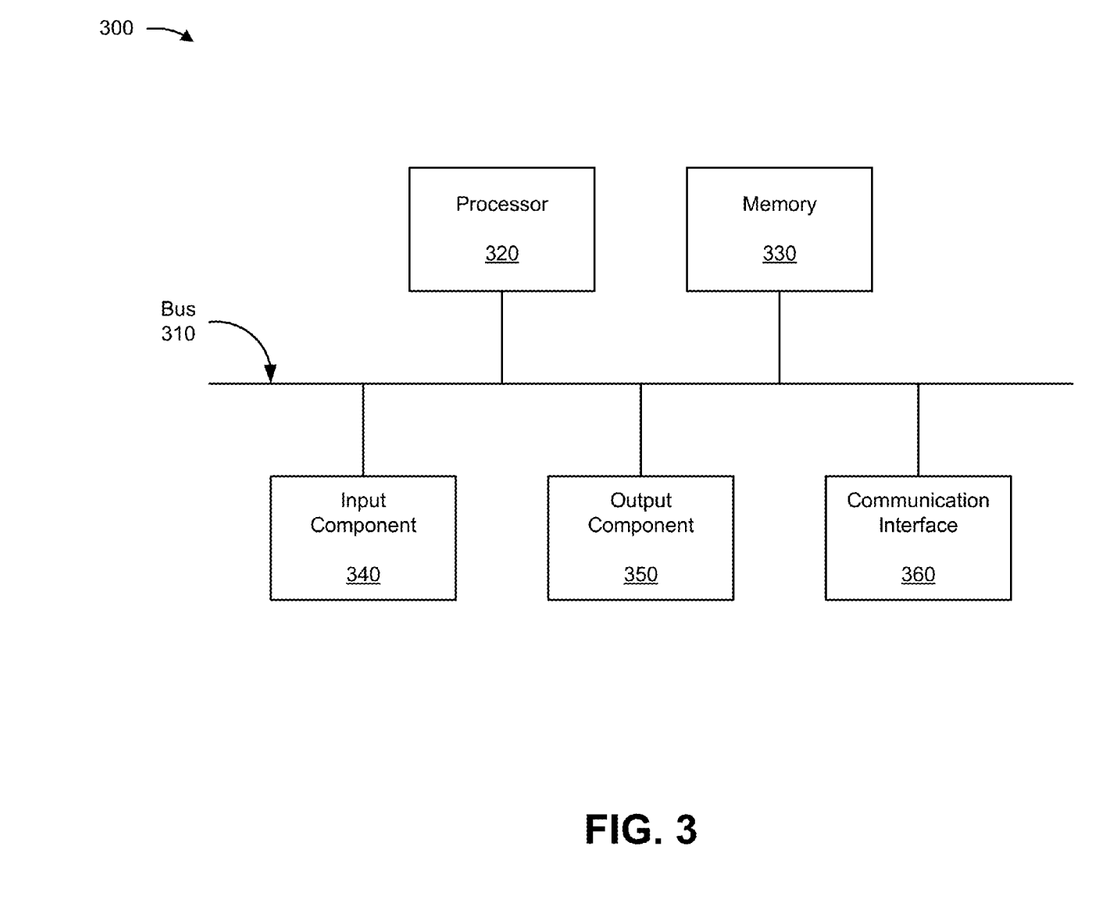
FIG. 3 is a diagram of example components of one or more devices of FIG. 2.

FIG. 3 is a diagram of example components of a device 300, which may correspond to client device 210, server device 220, and/or security device 230. In some implementations, client device 210, server device 220, and/or security device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or a processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
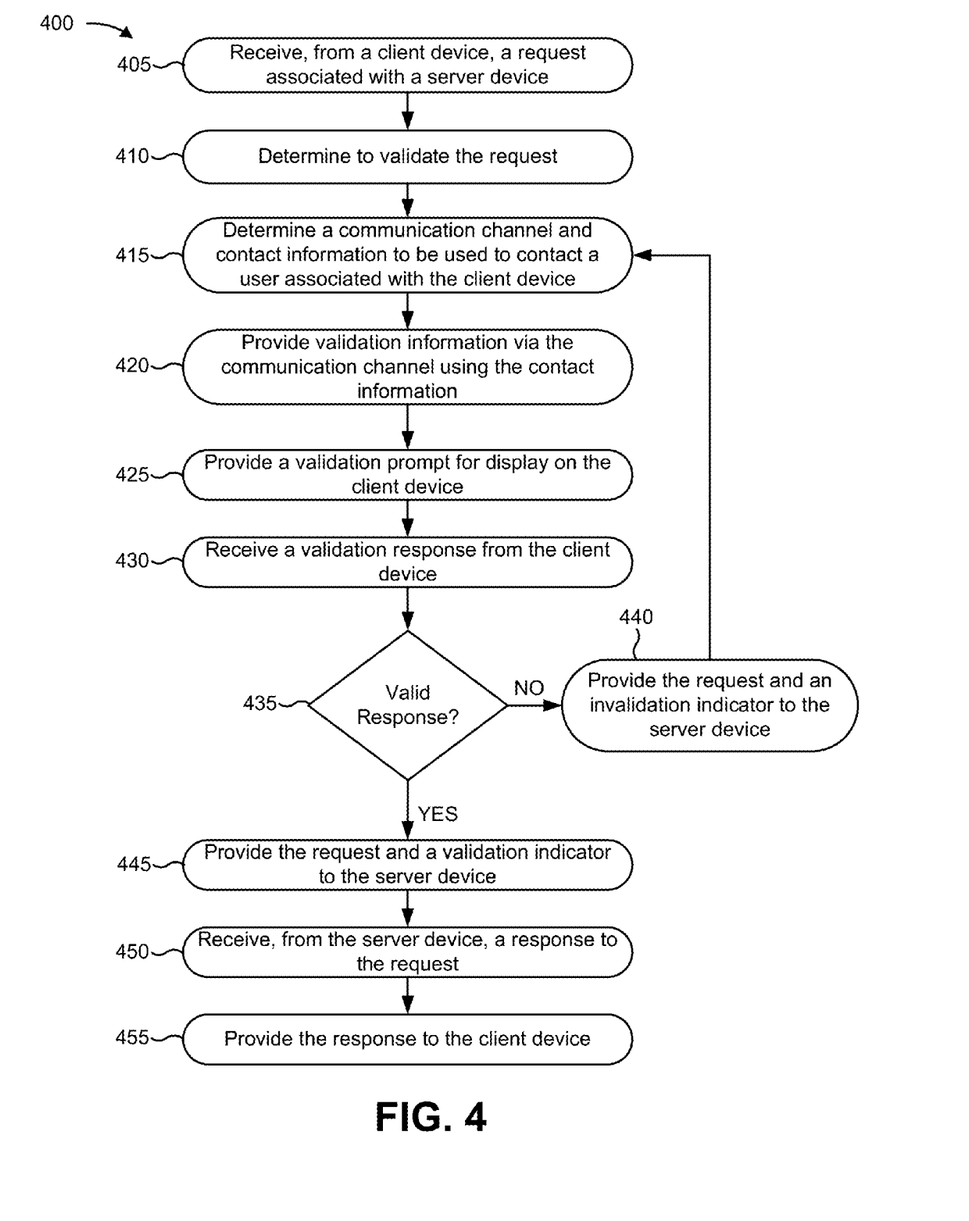
FIG. 4 is a flow chart of an example process for protecting sensitive web transactions using a communication channel associated with a user.

FIG. 4 is a flow chart of an example process 400 for protecting sensitive web transactions using a communication channel associated with a user. In some implementations, one or more process blocks of FIG. 4 may be performed by security device 230. In some implementations, one or more process blocks of FIG. 4 may be performed by another device or a group of devices separate from or including security device 230, such as client device 210 and/or server device 220.

As shown in FIG. 4, process 400 may include receiving, from a client device, a request associated with a server device (block 405). For example, security device 230 may receive a request from client device 210. The request may include an HTTP request generated using a web browser. Additionally, or alternatively, the request may include, for example, a request for a resource (e.g., a resource accessible by server device 220, such as a webpage, stored information, etc.), a request for an action and/or a transaction to be performed (e.g., a request for server device 220 to pay a bill, a request to transfer funds to or from a bank account, a request to purchase an item, etc.), or the like. The request may be intended for server device 220. For example, security device 230 may receive a request, from client device 210, that identifies a server device 220 for responding to the request.

As further shown in FIG. 4, process 400 may include determining to validate the request (block 410). For example, security device 230 may determine to validate the request. In some implementations, security device 230 may determine to validate the request based on the contents of the request, based on a client device 210 from which the request is received, based on a server device 220 for which the request is destined, based on a user associated with the request, based on a webpage associated with the request (e.g., a webpage to which a user is requesting access), or the like.

Additionally, or alternatively, security device 230 may provide the request to server device 220, and server device 220 may determine to validate the request (e.g., based on contents, client device 210, server device 220, a user, a webpage, etc.). Based on determining to validate the request, server device 220 may provide, to security device 230, information indicating that the request is to be validated (e.g., a validation request indicator). For example, server device 220 may provide a response to security device 230 with a validation request indicator in the header, in the body, etc., of the response. In some implementations, the response from server device 220 may include a response to the request from client device 210, and the response may be stored by security device 230 until client device 210 is validated. Once security device 230 validates client device 210 (e.g., a user associated with client device 210), then security device 230 may provide the response to client device 210.

As further shown in FIG. 4, process 400 may include determining a communication channel and contact information to be used to contact a user associated with the client device (block 415). For example, security device 230 may determine information identifying a communication channel associated with a user of client device 210 and information identifying contact information for the user. In some implementations, security device 230 may receive the information from server device 220. Additionally, or alternatively, security device 230 may retrieve the information from a memory accessible by security device 230. Additionally, or alternatively, security device 230 may access the information using an application programming interface via which security device 230 can request the information and server device 220 can provide the requested information.

Security device 230 may determine the communication channel and the contact information based on a user associated with client device 210, in some implementations. For example, a user may provide login information, via client device 210, to log into a website hosted by server device 220. The login information may be associated with one or more communication channels for contacting the user and/or may be associated with contact information for contacting the user (e.g., using one or more different communication channels).

A communication channel may include a message type to be used to contact the user. For example, a communication channel may include a text message (e.g., a short message service (SMS) text message, a multimedia messaging service (MMS) text message, etc.), a voice message, an email message, an instant message, a chat message, a social media message, or the like. Contact information may include information that allows security device 230 to contact the user via the communication channel (e.g., by identifying an endpoint for a message). For example, contact information may include a phone number (e.g., for a text message, a voice message, etc.), an email address (e.g., for an email message), a user name (e.g., for an instant message, a chat message, a social media message, etc.), or the like.

In some implementations, security device 230 may determine a communication channel based on available contact information for a user. For example, if security device 230 has access to a user's email address, but not a user's phone number, then security device 230 may determine to provide validation information via an email message rather than a text message or a voice message. When multiple communication channels are available, security device 230 may determine a communication channel based on a stored preference, a type of request (e.g., a login request, a transaction request, etc.), a sensitivity level of the request (e.g., a type of information requested), an indication from server device 220 (e.g., based on code stored on server device 220), or the like. Additionally, or alternatively, security device 230 may randomly determine the communication channel to make evasion by an attacker more difficult. For example, security device 230 may receive information identifying a set of available communication channels (and/or contact information associated with those channels), and may randomly select a communication channel, of the set of available communication channels, to be used for validation.

Security device 230 may determine contact information based on a selected communication channel, in some implementations. For example, if security device 230 determines to provide validation information via a text message or a voice message, then security device 230 may determine a phone number for contacting the user. As another example, if security device 230 selects a particular social media service for providing the validation information, then security device 230 may determine a username of the user for that social media service.

In some implementations, security device 230 may store information for determining the communication channel and/or the contact information. For example, security device 230 may store code that instructs security device 230 to determine the communication channel and/or the contact information. Additionally, or alternatively, server device 220 may store information (e.g., code) for determining the communication channel and/or the contact information, and may provide information identifying the communication channel and/or contact information to security device 230. For example, server device 220 may provide a validation request indicator to security device 230, and the validation request indicator may include information that identifies the communication channel and/or the contact information to be used to validate the user.

As further shown in FIG. 4, process 400 may include providing validation information via the communication channel using the contact information (block 420). For example, security device 230 may provide validation information to a user. Security device 230 may provide the validation information using a communication channel and contact information determined for the user. For example, security device 230 may provide the validation information via a text message, a voice message, an e-mail message, or the like, using the determined contact information for the user.

Validation information may include a validation code, in some implementations. A validation code may include a string of characters used to validate a user. In some implementations, the validation code may include an RSA token. Additionally, or alternatively, validation information may include a validation challenge, such as a question to which the user may provide a response (e.g., "What is your middle name?").

In some implementations, a user may interact with a website, and security device 230 may determine a communication channel (e.g., a message type), contact information, and/or a validation type (e.g., using a validation code, using a validation challenge, etc.) based on a sensitivity level of the interaction. For example, the user may attempt to log into a banking website (e.g., a less sensitive interaction), and security device 230 may send an email message with a validation code to the user's email address. Then, the user may attempt to transfer money from the user's bank account (e.g., a more sensitive interaction), and security device 230 may send an SMS message with a validation challenge (e.g., a security question) to the user's phone. In this way, the difficulty of validation may depend upon the sensitivity level of a user interaction (e.g., a type of transaction requested, a type of information requested, etc.). In other words, security device 230 may treat a more sensitive interaction using a more difficult validation technique than a less sensitive interaction.

As another example, security device 230 may use different validation techniques for user requests to access different portions of a website. For example, security device 230 may use a first validation technique (e.g., a voice message, with a validation code, via the user's phone) to grant or deny the user access to a first portion of the website, and may use a second validation technique (e.g., a social media message, with a validation challenge, via the user's social media account) to grant or deny the user access to a second portion of the website.

As further shown in FIG. 4, process 400 may include providing a validation prompt for display on the client device (block 425), and receiving a validation response from the client device (block 430). For example, security device 230 may provide, to client device 210, information that causes client device 210 to provide a validation prompt for display. A validation prompt may include a user interface or a portion of a user interface that permits the user to input information, such as a validation response (e.g., via a text box or another input mechanism). As an example, security device 230 may provide code (e.g., hypertext markup language (HTML) code) to client device 210, which may cause a browser, running on client device 210, to display the validation prompt.

Security device 230 may provide the validation prompt based on the communication channel, the contact information, and/or the validation information, in some implementations. For example, if security device 230 provides a validation code via an SMS text message to a user's cell phone, then the validation prompt may indicate that the validation code was sent to the user's cell phone using an SMS text message, and may identify the cell phone number to which the validation code was sent.

The user may input a validation response via the validation prompt, and client device 210 may provide the validation response to security device 230 for validation. For example, security device 230 may provide, to a user's phone, a text message with a validation code. The user may receive the text message using the user's phone, and may input the validation code into a browser of client device 210 (e.g., using the validation prompt). As another example, security device 230 may provide, to a user's email address, a validation challenge asking the user to input the answer to a challenge question via the validation prompt. The user may receive the email (e.g., using client device 210 and/or another device), and may input a validation response to the validation challenge via the validation prompt. A validation response may refer to information input by a user using the validation prompt, such as a validation code, an answer to a validation challenge, or the like. The user may provide the validation response to security device 230 via client device 210 and/or another device (e.g., the user's phone, a different client device 210 than the one that sent the request, etc.). Security device 230 may receive information that identifies the validation response.

As further shown in FIG. 4, process 400 may include determining whether the validation response is valid (block 435). For example, security device 230 may determine whether the validation response, received from client device 210, is valid. Security device 230 may make this determination based on the validation information provided via the communication channel. For example, if the validation information includes a validation code, then security device 230 may determine whether a validation code included in the validation response (e.g., received from client device 210) matches the validation provided via the communication channel. As another example, if the validation information includes a validation challenge, then security device 230 may determine whether an answer to the validation challenge, included in the validation response, matches a stored answer to the validation challenge (e.g., stored by security device 230 and/or server device 220).

As further shown in FIG. 4, if the validation response is not valid (block 435—NO), then process 400 may include providing the request and an invalidation indicator to the server device (block 440). For example, if security device 230 determines that the validation response is invalid, then security device 230 may provide an invalidation indicator, with the request (e.g., in a header of the request, in the body of the request, etc.), to server device 220. The invalidation indicator may instruct server device 220 to not respond to the request and/or to not provide a requested resource to client device 210. Additionally, or alternatively, security device 230 may not provide a validation indicator to server device 220. Additionally, or alternatively, security device 230 may drop the request from client device 210, may prevent server device 220 from providing a response to the request (e.g., by intercepting and dropping the response), may provide an indication to server device 220 that the request is invalid and should not be processed, and/or may take some other action to prevent an action in response to the request.

In some implementations, if security device 230 determines that the validation response is invalid, then security device 230 may return to block 415 to determine a communication channel (e.g., the same communication channel or a different communication channel) and/or contact information (e.g., the same contact information or different contact information) to be used to provide new validation information (e.g., the same validation information or different validation information) to the user. For example, a user may be given a threshold quantity of chances to input a validation response that is valid. Security device 230 may provide new validation information to the user based on whether the threshold has been satisfied.

As an example, security device 230 may use a first communication channel (e.g., an SMS message) and first contact information (e.g., a user's phone number) a first time that validation information is sent, and may use a second communication channel (e.g., an email message) and second contact information (e.g., a user's email address) a second time that validation information is sent. If validation fails a threshold quantity of times, then security device 230 may place the user and/or client device 210 on a blacklist (e.g., by storing information that identifies the user and/or client device 210), and may block the user and/or client device 210 from accessing server device 220.

In some implementations, security device 230 may receive information identifying the first communication channel, may receive the first contact information, may receive information identifying the second communication channel, may receive the second contact information, etc., from server device 220 based on transmitting the initial request to server device 220. In other words, security device 230 may receive information identifying multiple communication channels and may receive multiple items of contact information based on the initial request.

Additionally, or alternatively, security device 230 may receive information identifying the first communication channel and the first contact information from server device 220 based on the initial request. Security device 230 may then determine that the validation response is invalid, and may provide an invalidation indicator to server device 220. Based on providing the invalidation indicator, security device 230 may receive, from server device 220, information identifying the second communication channel and the second contact information. Security device 230 and server device 220 may continue to operate in this manner, determining a communication channel and contact information to be used for validation, until the user is validated or blocked.

As further shown in FIG. 4, if the validation response is valid (block 435—YES), then process 400 may include providing the request and a validation indicator to the server device (block 445). For example, if security device 230 determines that the validation response is valid, then security device 230 may provide the request and a validation indicator to server device 220. The validation indicator may indicate that the request is valid, and/or may instruct server device 220 to respond to the request. The validation indicator may include, for example, a string of characters recognizable by server device 220 as indicating a valid request (e.g., "IsValid=True"). Security device 230 may provide the validation indicator in a header of the request, a body of the request, or the like. Based on receiving the validation indicator, server device 220 may respond to the request and/or may perform an action identified in the request.

Security device 230 may store the request (e.g., based on receiving an indication from server device 220 that the request is to be validated). Once security device 230 has validated the request, security device 230 may provide the validation indicator to server device 220 in a header of the request. In other words, security device 230 may reissue the request to server device 220 with a header that indicates that the request has been validated. In this way, security device 230 may handle the validation processing to protect server device 220 from malicious attacks.

As further shown in FIG. 4, process 400 may include receiving, from the server device, a response to the request (block 450), and providing the response to the client device (block 455). For example, security device 230 may provide the request and the validation indicator to server device 220. Server device 220 may process the request and provide a response, to the request, to security device 230 based on receiving the validation indicator. Security device 230 may provide the response to client device 210. In this way, a user may be protected from unauthorized transactions because a malicious attacker may not have access to the communication channel used to provide the validation information to the user.

Additionally, or alternatively, security device 230 may store the original response from server device 220 (e.g., the response provided along with the validation request indicator). In this case, security device 230 may provide the original response to client device 210 based on determining that the validation response is valid (e.g., without requesting the original response from server device 220 after validation).

Although FIG. 4 shows example blocks of process 400, in some implementations, process 400 may include additional blocks, fewer blocks, different blocks, or differently arranged blocks than those shown in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of protecting a web transaction using a communication channel associated with a user.

Figure 5A:
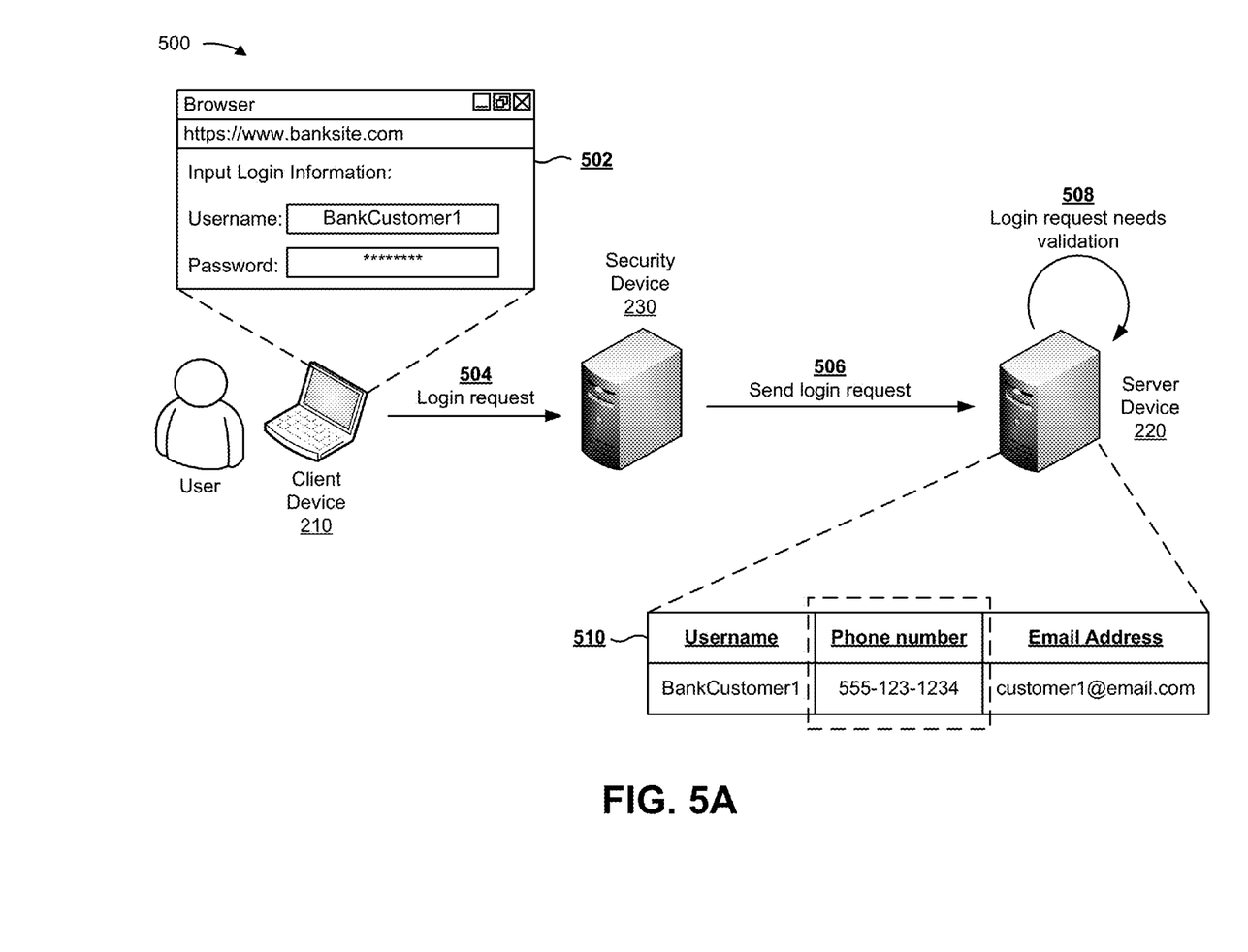
FIGS. 5A-5D are diagrams of an example implementation relating to the example process shown in FIG. 4.

As shown in FIG. 5A, and by reference number 502, assume that a user is attempting to log into a banking website, shown as www.banksite.com. For example, assume that the user has entered the user's username, shown as BankCustomer1, and the user's password to log into the website. The user enters the username and password into a browser running on client device 210. Assume that server device 220 hosts the website www.banksite.com. As shown by reference number 504, client device 210 sends the login request, intended for server device 220, to security device 230. As shown by reference number 506, security device 230 forwards the login request to server device 220. As shown by reference number 508, server device 220 determines that the login request needs validation. For example, server device 220 may require validation for all login requests (e.g., when the website or the type of information being requested is highly sensitive). As another example, server device 220 may require validation for a particular percentage of login requests and/or may randomly require validation for login requests (e.g., when the website or the type of information being request is less sensitive). Assume that server device 220 determines to perform validation using an SMS text message. As shown by reference number 510, based on this determination, server device 220 determines a phone number associated with BankCustomer1, shown as 555-123-1234.

Figure 5B:
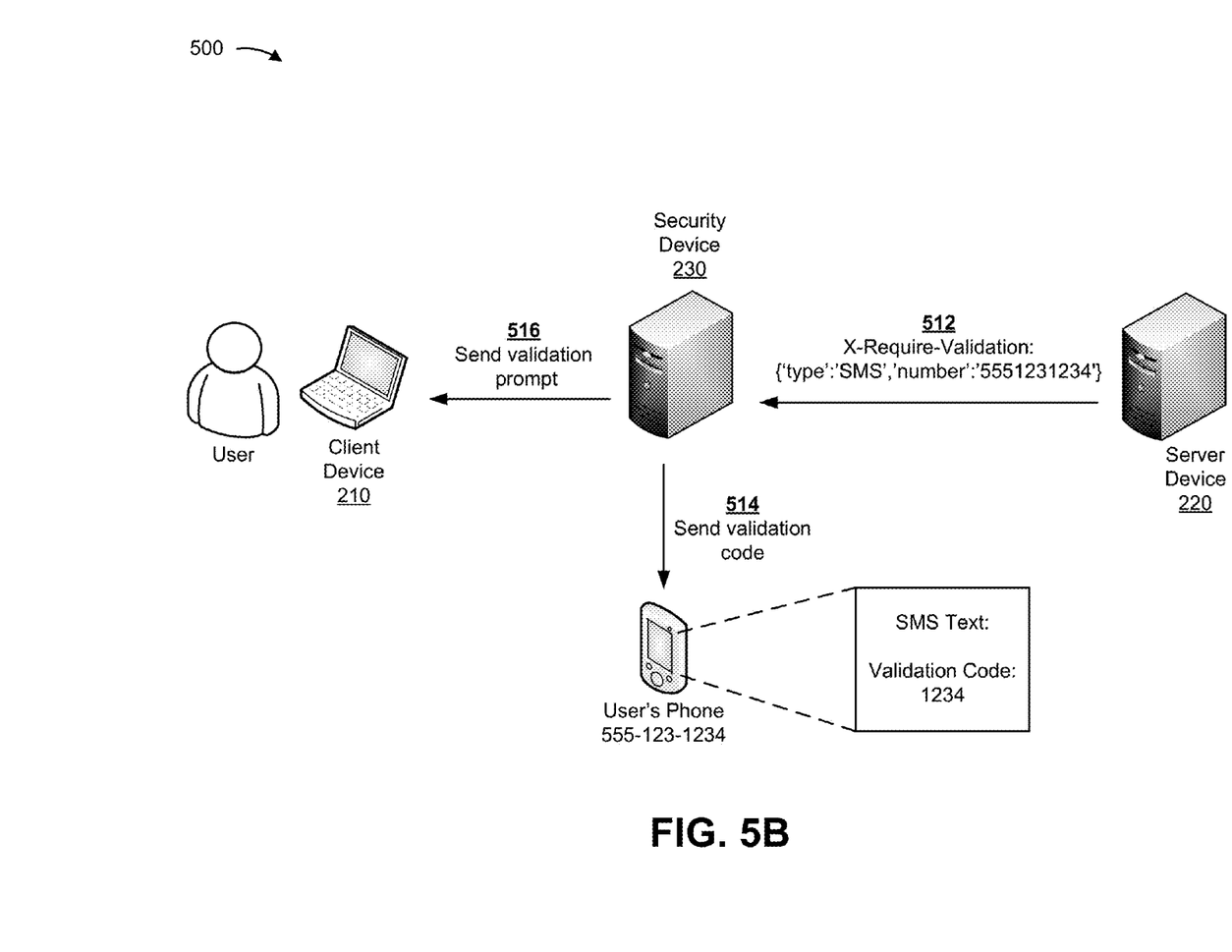

As shown in FIG. 5B, and by reference number 512, server device 220 provides an indication to security device 230 that the user is to be validated, and further identifies the communication channel and the contact information to be used for validation. For example, server device 220 provides a response to security device 230 that includes a header shown as X-Require-Validation: {'type':'SMS','number':'5551231234'}, which indicates the type of communication channel (e.g., an SMS message), and the phone number to use for validation (e.g., 555-123-1234). As shown by reference number 514, security device 230 sends a validation code, via an SMS text message, to the user's phone with the phone number 555-123-1234. As shown, assume that the validation code is "1234." As shown by reference number 516, security device 230 also sends information that causes a validation prompt to be provided for display by client device 210.

Figure 5C:
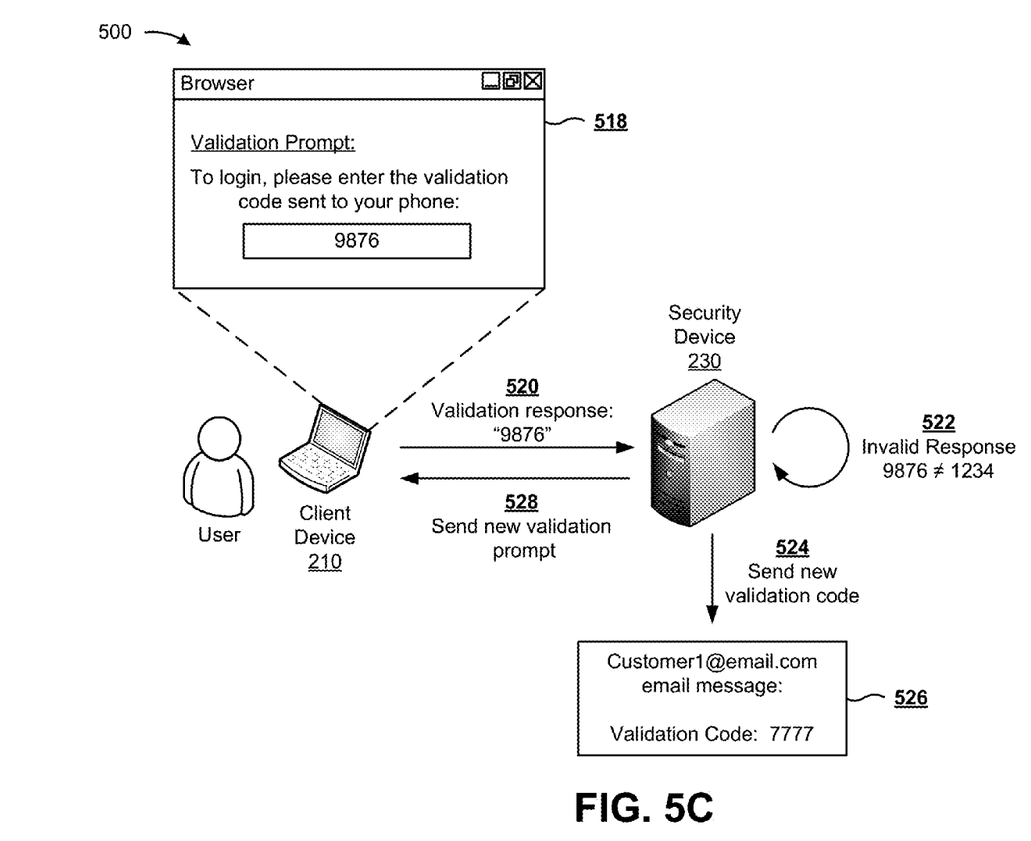

As shown in FIG. 5C, and by reference number 518, client device 210 provides the validation prompt for display via the browser. Assume that the user inputs a validation response of "9876" via the validation prompt. As shown by reference number 520, client device 210 sends the validation response of "9876" to security device 230. As shown by reference number 522, security device 230 compares the validation response of "9876" to the validation code of "1234" previously sent to the user's phone, and determines that the validation response does not match the validation code. Thus, security device 230 determines that the validation response is invalid.

As shown by reference number 524, security device 230 determines to send a new validation code to the user's email address. In some implementations, server device 220 may provide instructions to security device 230 indicating a quantity of attempts to give a user to provide a correct validation response (e.g., before locking the user out of the website). Additionally, or alternatively, server device 220 may provide information indicating different communication channels and/or contact information to be used when the user inputs an incorrect validation response. Server device 220 may provide this information to security device 230 upon receiving the initial request. Additionally, or alternatively, server device 220 may provide this information to security device 230 after the initial request and after one or more incorrect validation responses.

For the purpose of FIG. 5C, assume that security device 230 has received instructions from server device 220 indicating that a user is to be given two attempts to provide a correct validation response, that a first validation code is to be sent to the user's phone (e.g., 555-123-1234) on the first attempt, and that a second validation code is to be sent to the user's email address (e.g., customer1@email.com) on the second attempt. As shown by reference number 526, assume that security device 230 sends a validation code of "7777" to the user's email address. As shown by reference number 528, security device 230 also sends information that causes a validation prompt (e.g., a different validation prompt) to be provided for display by client device 210.

Figure 5D:
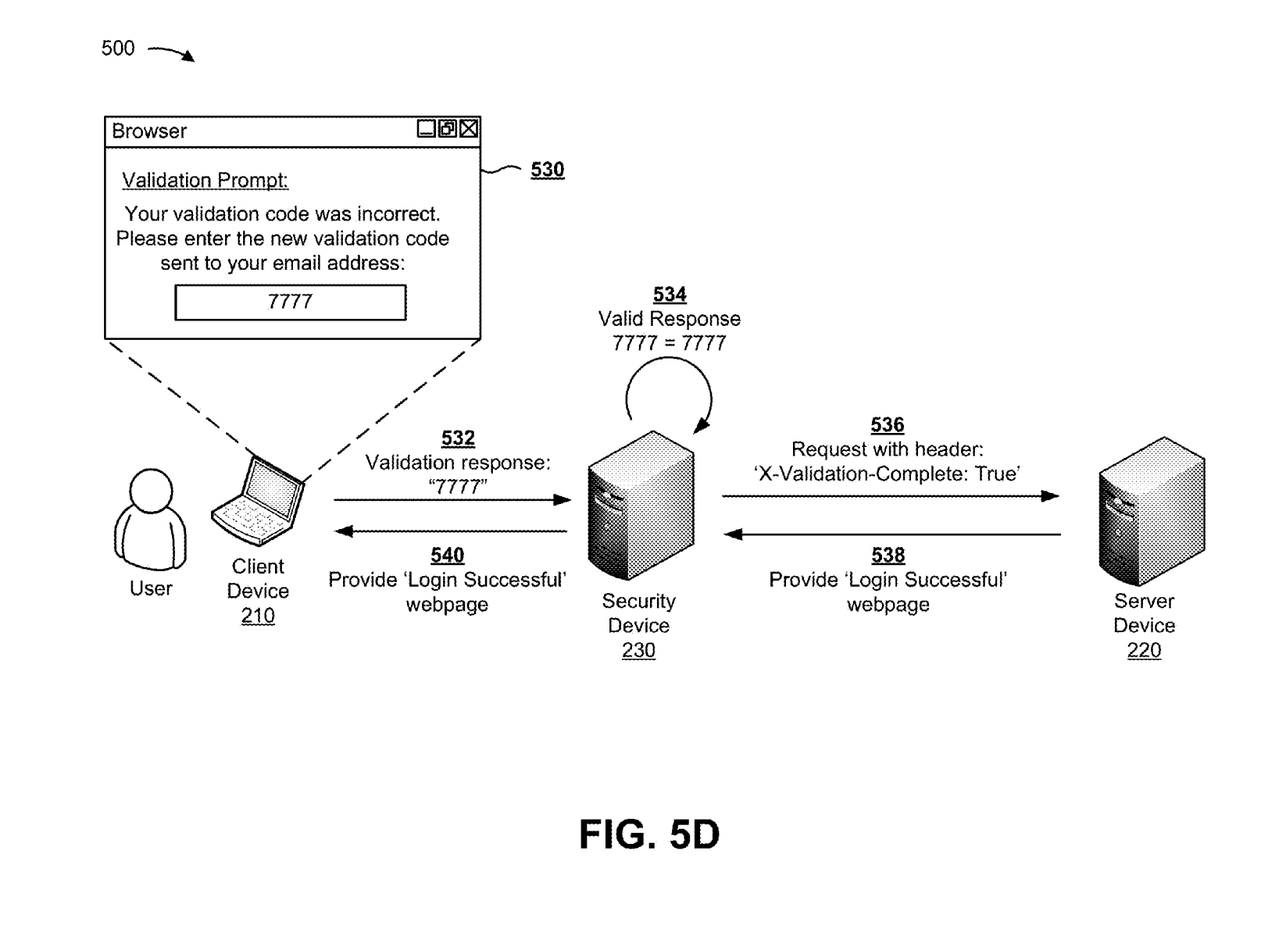

As shown in FIG. 5D, and by reference number 530, client device 210 provides the validation prompt for display via the browser. Assume that the user inputs a validation response of "7777" via the validation prompt. As shown by reference number 532, client device 210 sends the validation response of "7777" to security device 230. As shown by reference number 534, security device 230 compares the validation response of "7777" to the validation code of "7777" previously sent to the user's email address, and determines that the validation response matches the validation code. Thus, security device 230 determines that the validation response is valid.

As shown by reference number 536, security device 230 may retransmit the original request from client device 210 to server device 220, and may include a header in the request that includes a validation indicator. For example, assume that the validation indicator is included in the header as X-Validation-Complete: True. Server device 220 receives the request, determines that the validation indicator is present in the request, and provides a response to the request. For example, as shown by reference number 538, server device 220 provides a "Login Successful" webpage, intended for client device 210, to security device 230. As shown by reference number 540, security device 230 provides the webpage to client device 210 for display via the browser. In this way, server device 220 and/or security device 230 may protect a user from malicious attacks (e.g., attempts to discover the user's banking information) by validating a user prior to permitting the user to access sensitive information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein as receiving information from a device or providing information to a device. These phrases may refer to receiving information directly from a device or providing information directly to a device, without the information being transferred via an intermediary device situated along a communication path between devices. Additionally, or alternatively, these phrases may refer to receiving information, provided by a device, via one or more intermediary devices (e.g., network devices), or providing information to a device via one or more intermediary devices.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive, from a client device, a request associated with a server device;
   determine a sensitivity level associated with the request;
   determine, based on the sensitivity level, a communication channel for validating the request,
   the communication channel being different than another communication channel via which the request is received;
   determine contact information for contacting a user, associated with the request, via the communication channel;
   provide validation information via the communication channel using the contact information;
   receive a validation response from the client device;
   determine, based on the validation information and the validation response, whether the validation response is valid;
   selectively perform a first action or a second action based on determining whether the validation response is valid,
   the first action being performed based on determining that the validation response is valid,
   the first action including providing a validation indicator, with the request, to the server device,
   the validation indicator instructing the server device to respond to the request; and
   the second action being performed based on determining that the validation response is not valid,
   the second action including providing an invalidation indicator, with the request, to the server device,
   the invalidation indicator instructing the server device to not respond to the request.

2. The device of claim 1, where the one or more processors, when determining the communication channel, are to:
   provide the request to the server device;
   receive, from the server device, information that identifies the communication channel based on providing the request to the server device; and
   determine the communication channel based on the received information that identifies the communication channel.

3. The device of claim 1, where the one or more processors, when determining the contact information, are to:
   provide the request to the server device;
   receive, from the server device, information that identifies the contact information based on providing the request to the server device; and
   determine the contact information based on the received information that identifies the contact information.

4. The device of claim 1, where the one or more processors, when receiving the validation response, are to:
   provide information that causes a validation prompt to be provided for display via the client device; and
   receive the validation response based on providing the information that causes the validation prompt to be provided for display,
   the validation response being input via the validation prompt.

5. The device of claim 1, where the one or more processors, when selectively performing the first action, are to:
   provide the request and the validation indicator to the server device,
   the validation indicator indicating that the request has been validated;
   receive, from the server device, a response to the request; and
   provide the response to the client device.

6. The device of claim 5, where the one or more processors, when providing the request and the validation indicator, are to:
   provide the validation indicator in a header of the request.

7. The device of claim 1, where the one or more processors, when selectively performing the second action, are to:

provide new validation information via the communication channel using the contact information,
    the new validation information being different from the validation information;
receive a new validation response from the client device;
determine, based on the new validation information and the new validation response, whether the new validation response is valid; and
selectively perform the first action or the second action based on determining whether the new validation response is valid.

8. A computer-readable medium storing instructions, the instructions comprising:
one or more instructions that, when executed by one or more processors, cause the one or more processors to:
    receive, from a client device, a request associated with a user and intended for a server device,
        the request being sent via a browser of the client device;
    determining a sensitivity level associated with the request;
    determine, based on the sensitivity level, a message type for validating the request;
    determine contact information, for contacting the user, based on the message type;
    provide validation information via the message type and using the contact information;
    receive a validation response from the client device;
    determine, based on the validation information and the validation response, whether the validation response is valid;
    selectively perform a first action or a second action based on determining whether the validation response is valid,
        the first action being performed based on determining that the validation response is valid,
            the first action including providing a validation indicator, with the request, to the server device,
            the validation indicator instructing the server device to respond to the request; and
        the second action being performed based on determining that the validation response is not valid,
            the second action including providing an invalidation indicator, with the request, to the server device,
            the invalidation indicator instructing the server device to not respond to the request.

9. The computer-readable medium of claim 8, where the one or more instructions, that cause the one or more processors to determine the message type, further cause the one or more processors to:
provide the request to the server device;
receive, from the server device, information that identifies the message type based on providing the request to the server device; and
determine the message type based on the received information that identifies the message type.

10. The computer-readable medium of claim 8, where the one or more instructions, when executed by the one or more processors, further cause the one or more processors to:
determine whether the sensitivity level is a low sensitivity level or a high sensitivity level; and
where the one or more instructions, that cause the one or more processors to provide the validation information, further cause the one or more processors to:
    provide a validation code when the sensitivity level is the low sensitivity level; or
    provide a validation challenge when the sensitivity level is the high sensitivity level,
        the validation challenge being different from the validation code.

11. The computer-readable medium of claim 8, where the one or more instructions, that cause the one or more processors to receive the validation response, further cause the one or more processors to:
provide, based on the message type and the contact information, information that causes a user interface to be provided for display via the client device; and
receive the validation response based on providing the information that causes the user interface to be provided for display,
    the validation response being input via the user interface.

12. The computer-readable medium of claim 8, where the one or more instructions, that cause the one or more processors to selectively perform the first action, further cause the one or more processors to:
provide the request and the validation indicator to the server device,
    the validation indicator indicating that the request has been validated;
receive, from the server device, a response to the request; and
provide the response to the client device.

13. The computer-readable medium of claim 12, where the one or more instructions, that cause the one or more processors to provide the request and the validation indicator, further cause the one or more processors to:
provide the validation indicator in a header of the request.

14. The computer-readable medium of claim 8, where the one or more instructions, that cause the one or more processors to selectively perform the second action, further cause the one or more processors to:
provide new validation information via the message type using the contact information,
    the new validation information being different from the validation information;
receive a new validation response from the client device;
determine, based on the new validation information and the new validation response, whether the new validation response is valid; and
selectively perform the first action or the second action based on determining whether the new validation response is valid.

15. A method, comprising:
receiving, by one or more security devices and from a client device, a request for a resource;
determining, by the one or more security devices, a sensitivity level associated with the request;
determining, by the one or more security devices and based on the sensitivity level, a communication channel for validating the request,
    the communication channel being different than another communication channel via which the request is received;
determining, by the one or more security devices, contact information for contacting a user, associated with the request, via the communication channel;
providing, by the one or more security devices, validation information via the communication channel using the contact information;
receiving, by the one or more security devices, a validation response;

determining, by the one or more security devices and based on the validation information and the validation response, whether the validation response is valid;

selectively performing, by the one or more security devices, a first action or a second action based on determining whether the validation response is valid, the first action being performed based on determining that the validation response is valid, the first action including providing a validation indicator, with the request, to a server device, the validation indicator instructing the server device to provide the resource to the client device; and the second action being performed based on determining that the validation response is not valid, the second action including providing an invalidation indicator, with the request, to the server device, the invalidation indicator instructing the server device to not provide the resource to the client device.

16. The method of claim 15, where determining the communication channel for validating the request comprises:

determining available contact information for contacting the user;

determining a set of available communication channels for contacting the user based on the available contact information;

selecting a particular communication channel of the set of communication channels; and determining the communication channel based on the particular communication channel.

17. The method of claim 16, where selecting the particular communication channel of the set of communication channels comprises:

randomly selecting a communication channel of the set of communication channels.

18. The method of claim 15, where selectively performing the second action comprises:

determining a new communication channel for validating the request, the new communication channel being different from the communication channel;

providing new validation information via the new communication channel, the new validation information being different from the validation information;

receiving a new validation response;

determining, based on the new validation information and the new validation response, whether the new validation response is valid; and selectively performing the first action or the second action based on determining whether the new validation response is valid.

19. The method of claim 15, where the request is a first request and the resource is a first resource; and where the method further comprises:

receiving a second request for a second resource, the second resource being different from the first resource;

determining a new communication channel for validating the second request, the new communication channel being different from the communication channel;

providing new validation information via the new communication channel, the new validation information being different from the validation information;

receiving a new validation response;

determining, based on the new validation information and the new validation response, whether the new validation response is valid; and selectively performing a third action or a fourth action based on determining whether the new validation response is valid, the third action being performed based on determining that the new validation response is valid, the third action including providing a new validation indicator, with the second request, to the server device, the new validation indicator instructing the server device to provide the second resource to the client device; and the fourth action being performed based on determining that the new validation response is not valid, the fourth action including providing a new invalidation indicator, with the second request, to the server device, the new invalidation indicator instructing the server device to not provide the second resource to the client device.

20. The method of claim 15, where providing the validation information via the communication channel comprises:

providing the validation information via a first communication channel when the sensitivity level is a low sensitivity level, or providing the validation information via a second communication channel when the sensitivity level is a high sensitivity level, the second communication channel being different from the first communication channel.

* * * * *